United States Patent [19]

Baumgartner et al.

[11] 4,110,828
[45] * Aug. 29, 1978

[54] ERROR PREVENTING INCREMENTAL MEASURING SYSTEM

[75] Inventors: Alfons Baumgartner, Grassau; Walter Berg, Balingen; Horst Burkhardt, Stein an der Traun; Jürgen Läubin, Rosenfeld; Helmut Schlick, Traunreut, all of Germany

[73] Assignee: Dr. Johannes Heidenhain GmbH, Traunreut, Germany

[*] Notice: The portion of the term of this patent subsequent to Feb. 29, 1992, has been disclaimed.

[21] Appl. No.: 334,036

[22] Filed: Feb. 20, 1973

[30] Foreign Application Priority Data

Feb. 16, 1972 [DE] Fed. Rep. of Germany ....... 2207224

[51] Int. Cl.² ............................................. G06F 11/10
[52] U.S. Cl. ................................... 364/562; 364/567; 364/571; 235/92 EC
[58] Field of Search ........... 235/151.32, 151.3, 92 EC, 235/92 WT, 92 DN, 92 LG, 92 CA; 250/219 DR; 356/138; 340/146.1, 347

[56] References Cited

U.S. PATENT DOCUMENTS

| | | | |
|---|---|---|---|
| 3,638,186 | 1/1972 | Schwefel | 235/92 CA |
| 3,729,621 | 4/1973 | Taisne | 235/92 LG |
| 3,733,472 | 5/1973 | Taisne | 235/92 EC |

OTHER PUBLICATIONS

Incrementing Positioning Control circuit, IBM IBM Technical Disclosure Bullentin, vol. 6, No. 10, Mar. 1964, J. M. Scalone & W. J. Wheeler, pp. 53-55.

*Primary Examiner*—Edward J. Wise
*Attorney, Agent, or Firm*—Hume, Clement, Brinks, Willian & Olds, Ltd

[57] ABSTRACT

An error preventing incremental measuring system utilizes a plurality of scanning elements associated to a relatively movable divided scale. But, instead of merely comparing the results of a plurality of independent channels originating at the scanning elements and terminating at separate counters, the system according to the invention combines the signals from the scanning elements by way of a logical network into a further signal similar resp. dissimilar to one or more of the scanning signals, thus avoiding the necessity of fault tolerances.

14 Claims, 5 Drawing Figures

ERROR PREVENTING INCREMENTAL MEASURING SYSTEM

The present invention concerns an incremental measuring system secured against faults, more particularly for a weighing balance. For providing security against faults, due to breakdown or disturbance in the scanning, evaluating or indicating system, it may be obvious to provide all the necessary individual units (scanners, converters and counters) in duplicate and to operate them in parallel, a comparison being made of the results obtained on both channels. In a device for providing security against faults, which operates in such a manner, it would not be possible to adjust the scanners with such accuracy in each position of the distance measuring system as to exclude with certainty the case where two scanners corresponding to each other give different binary values, although there is no fault. To obviate this disadvantage, a certain difference in the final measured values might be tolerated without initiating a fault indication. In this case, however, the security against faults would be deficient and therefore unsatisfactory. It would be also possible, by means of a switching element with time behaviour, for the occurrence of a fault indication, lying below a certain length of time, to be suppressed or remain ignored. It is true that it is possible in this way to eliminate a large proportion of cases of false alarm. If, however, the distance measuring device would remain in a transient position in which mutually corresponding scanners supply different binary values, a false alarm nevertheless did occur. This mode of operation would be useless on account of the accompanying delays and interruptions in the work. In addition, it would be possible to provide only the evaluating and indicating system in duplicate, and the scanners only singly, whereby it is true that the false alarms attributable to the scanners would be eliminated. Instead, however, the scanners themselves would be withdrawn from test.

It is the aim of the invention to obviate the disadvantages of the possibilities described above, of providing security against faults, and to improve very considerably the security against faults and make it more reliable in operation without initiating unnecessary and troublesome fals alarms. The invention achieves this objective by means of the steps indicated in the claims.

An embodiment example of the invention is explained in the following description with reference to the accompanying drawings, in which.

Figure 1:
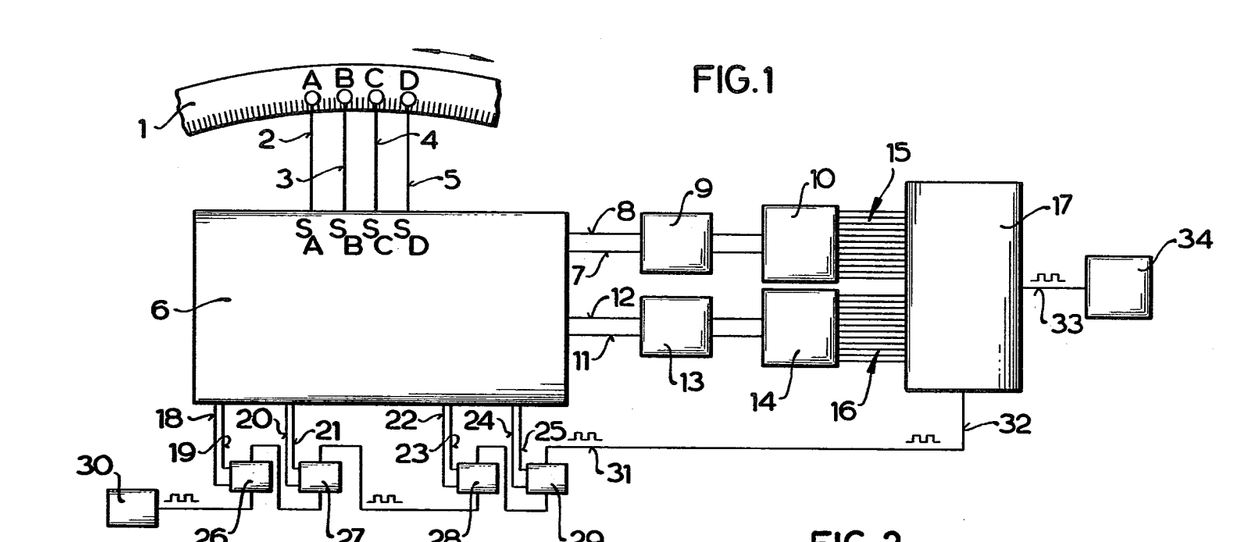
FIG. 1 shows a block circuit diagramm of the entire arrangement.

The distance measuring system comprises an incremental scale 1, whose graduation is constructed for example in known manner as line grating. This incremental scale 1 moves in the direction of the arrows relative to a stationary scanning device, which in the example shown comprises four scanners A, B, C and D. These scanners may be line grating plates in known manner, which are situated at a short distance in front of the incremental scale 1 and have the same line grating as the latter. Photosensitive cells, arranged in front of the line grating plates, receive the light passing through the incremental scale and the scanning line-grating plates. Consequently, on the passage of light through the incremental scale 1 photoelectric current fluctuations are produced and can be counted in known manner. Of course, instead of this photoelectric scanning any other known scanning method may be used. The method of scanning is not subject matter of the invention and therefore is not described further in detail.

Figure 2:
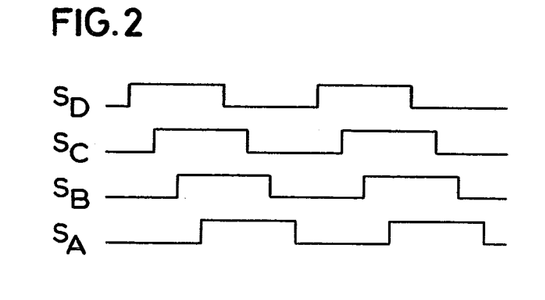
FIG. 2 shows a possible example of the time sequence of the scanning signals.

For the further description, it is assumed that the signals delivered by the scanners are supplied to a pulse shaping stage, so that on the leads 2, 3, 4 and 5 there are already binary signals $S_A$, $S_B$, $S_C$ and $S_D$, i.e. signals which assume only predetermined signal levels. The scanners A, B, C and D are arranged relative to each other in such a manner that phase-displaced binary signals are formed. FIG. 2 shows the mutual phase position in the assumed example of binary signals $S_A$, $S_B$, $S_C$ and $S_D$ supplied by the scanners A, B, C, D.

The signals $S_A$, $S_B$, $S_C$, $S_D$ are applied to the input of a scanning network 6, the construction of which will be described later. Its purpose is to produce two pairs of output signals ⅞ and 11/12 which are each independently suitable for controlling a direction discriminator and counter. One pair of output signals ⅞ controls the direction discriminator 9 and the counter 10, and the other pair 11/12 controls the direction discriminator 13 and counter 14. As long as the scanners, A, B, C, D and the scanning network 6 themselves function faultlessly, the counting process in channel 7, 8, 9, 10 proceeds completely identically with the counting process in channel 11, 12, 13, 14, apart from slight transit time differences in both channels. The construction and mode of operation of direction discriminators and counters are known, and therefore their construction will not be discussed here. It may merely be mentioned that the signal pairs necessary at the input of the direction discriminator 9 or 13 are respectively signals ⅞ and 11/12, phase-displaced by 90° relative to each other.

Counter 10, as also counter 14, make available the counter result at their respective outputs 15 and 16, coded for example binary-decimally. The two counter results now pass to a comparison circuit 17, which will be described more particularly later and which ascertains whether the two counter results are the same.

The scanning network 6 also has outputs 18, 19, 20, 21, 22, 23, 24, 25. At these outputs there appear in pairs signals which should be the same if the scanning network is functioning satisfactorily. There is the requirement that the circuits used should be very substantially self-testing. The output signals 18 to 25 are output signals of circuit elements of the scanning network 6, whose errors could not be recognised on the basis of the function of this network alone. They arrive in pairs in respective comparators 26, 27, 28, 29 which ascertain equality.

A timing generator 30 provides a time signal of substantially constant frequency. Each individual comparator, as will be explained more particularly later, operates in a manner such that it supplies at its output a signal, which is equal in frequency to the input signal if the compared signals are equal and the comparator itself is working properly, and such that it does not deliver at its output any alternating signal if the compared signals are unequal or the comparator itself is operating defectively. It is thus possible to connect a number of comparators in series so that the output of the preceding comparator in each case is connected to the time signal input of the next comparator. The time frequency then appears at the output of the last comparator only when all the signals to be compared are equal in pairs and all the comparators are operating satisfactorily. At the output 31 of the comparator 29, the time frequency therefore appears in the case of faultless operation.

The comparison circuit 17 also has a timing frequency input 32. Provided the counter positions 15 and 16 to be compared are the same and the comparison circuit 17 is itself operating satisfactorily, the timing frequency again appears at the output 33 of the comparison circuit 17. An indicating circuit 34 now ascertains whether or not the timing frequency appears at the output 33 of the comparison circuit 17. The indicating circuit 34 comprises a time member which ignores the short pulses produced from the transit time differences in the two channels 7, 8, 9, 10 and 11, 12, 13, 14. The indicating circuit 34 now ascertains whether the timing frequency is or is not present at the output 33 of the comparison circuit 17. The indicating circuit 34 comprises a time element which ignores the short pulses formed from the transit-time differences in the two channels 7, 8, 9, 10 and 11, 12, 13, 14. The indicating circuit 34 therefore comprises for example a rectifier followed by a storage capacitor and leakage resistance. The time constant of the RC member is so dimensioned that the scanning ratio of the timing frequency suffices for controlling an indicating instrument, but not short signal peaks from transit time effects. The fact that the presence of a timing signal indicates satisfactory operation of the entire arrangement is a further advantage of the invention, since in this way faults can be detected with considerably greater certainty, compared with an arrangement in which the occurrence of the signal would have to signal a fault. The function of the time member mentioned in the foregoing must not be confused with the function of the time member which was mentioned at the beginning with reference to the state of the art. The time member mentioned in connection with the state of the art had to suppress a false alarm which would otherwise have been possible owing to defective adjustment of the scanners. The present time member does not suppress a wrong alarm but prevents indications of faultless operation owing to pulses originating from transit-time effects. These last-mentioned short pulses, independently of the instantaneous speed of the scanned increment scale 1, are of course almost always on the stoppage of this scale of the same short length which is not sufficient to control the indicating instrument in the indicating circuit 34 by means of the time member.

Figure 3:
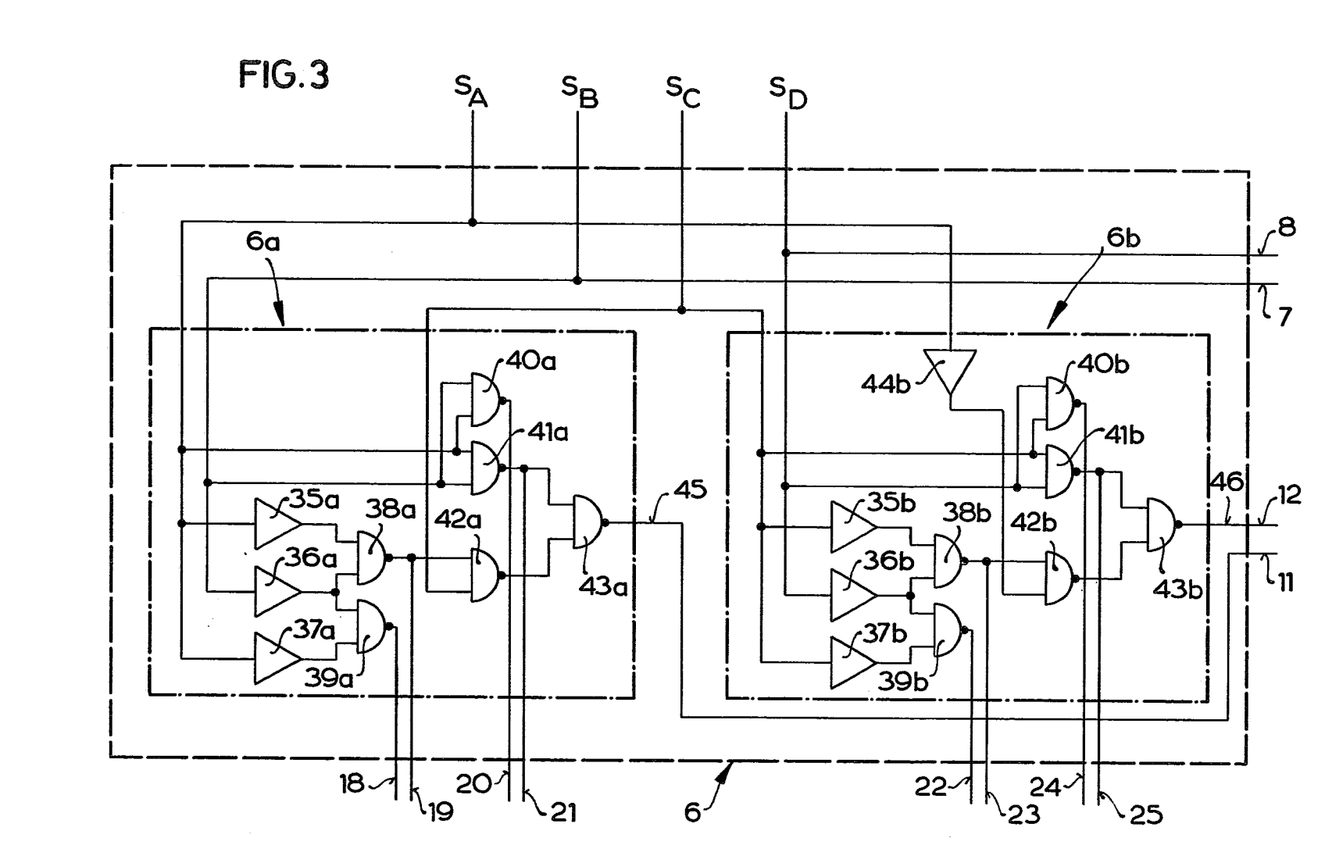
FIG. 3 shows a possible circuit arrangement of the scanning network.

FIG. 3 shows the scanning network 6. It is composed of two almost identical networks 6a and 6b. Each of these scanning networks 6a and 6b consists of three inverters 35a (35b), 36a (36b), 37a (37b) and six NAND gates 38a (38b), 39a (39b), 40a (40b), 41a (41b), 42a (42b), 43a (43b); the scanning network 6b in addition has an inverter 44b. The output 45 of the scanning network 6a supplies a signal which is equal to the signal $S_B$ if all scanners A, B, C and the scanning network 6a are working satisfactorily, and is unequal to the signal $S_B$ if any of the scanners A, B, C are operating defectively. For the sequence of scanning signals assumed for the example of FIG. 2, this is attained by the fact that the scanning network 6a operates according to the logical function $S^+_B = S_A S_B + S_B S_C + S_A S_C$ In this case, the fault-proof construction of the network 6a is achieved by putting $S_A$ or $S_B$ or $S_C$ outside brackets. In network 6a for this purpose the logical function $S^+_B = S_A S_B + S_C(S_A + S_B)$ is realised by putting $S_C$ outside the brackets. The function of network 6a and its individual gates will be seen from the following table:

| | | | Outputs of gates | | | | | | | | Comparison of $S_B$ with output |
|---|---|---|---|---|---|---|---|---|---|---|---|
| $S_A$ | $S_B$ | $S_C$ | 35a | 36a | 37a | 38a | 39a | 40a | 41a | 42a | 43a | 43a (=45) |
| 0 | 0 | 0 | 1 | 1 | 1 | 0 | 0 | 1 | 1 | 1 | 0 | equal |
| 0 | 0 | 1 | 1 | 1 | 0 | 0 | 1 | 1 | 1 | 0 | equal |
| 0 | 1 | 0 | 1 | 0 | 0 | 1 | 1 | 1 | 1 | 1 | 0 | unequal |
| 0 | 1 | 1 | 1 | 0 | 0 | 1 | 1 | 1 | 1 | 0 | 1 | equal |
| 1 | 0 | 0 | 0 | 1 | 1 | 1 | 1 | 1 | 1 | 1 | 0 | equal |
| 1 | 0 | 1 | 0 | 1 | 1 | 1 | 1 | 1 | 1 | 0 | 1 | unequal |
| 1 | 1 | 0 | 0 | 0 | 1 | 1 | 0 | 0 | 1 | 1 | equal |
| 1 | 1 | 1 | 0 | 0 | 1 | 1 | 0 | 0 | 0 | 1 | equal |

An accurate fault analysis shows that, with the exception of two cases, still to be mentioned, all the simple faults occurring in this network may be recognised by comparing $S_B$ with 45. By "simple" fault is here understood the case where only one fault occurs simultaneously in the entire system. As "fault" one of the following cases will be understood.

One of the scanning signals remain continuously at 0 or 1 even with the incremental scale running through. It is here immaterial whether this fault is caused by the scanning photoelectric cell, amplifier or pulse shaper.

One of the switching or connecting elements of the scanning network continuously delivers 0 or 1 at its output, even with the incremental scale running through.

At an input of one of the circuit elements or connecting elements of the scanning network 0 or 1 is continuously present, in which case this fault may lie in the circuit element itself or originate from the control thereof.

The above-mentioned two exceptions are $S_A$ — input of gate 41a continuously equal to 1.
$S'_A$ — input of gate 38a continuously equal to 1.

These two faults, however, may be recognised in the present case since each of the gates 38a and 41a are duplicated and the outputs may be tested by special comparators. This results in the complete circuitry of the scanning network 6a (or 6b) shown in FIG. 3, in which there is associated with gate 38a (or 38b) a second identical gate 39a (or 39b) controlled by the same input signal and having its output signal 18 (or 22) compared with the output signal 19 (or 23) by a special comparator 26 (or 28). In the same way, there is associated with the gate 41a (or 41b) a gate 40a (or 40b) for testing.

The scanning network 6b operates quite analogously to the scanning network 6a, with the sole difference that it is provided with other input signals $S_C$, $S_D$, $S_A$, of which the signal $S_A$ is transformed by the inverter 44b and consequently operates according to the logical function $S^+_D = S_C S_D + S'_A \cdot (S_C + S_D)$. Whereas the scanning network 6a at the output 45 delivers a signal $S^+_B$, which in faultless operation is equal to the input signal $S_B$, the scanning network 6b at its output 46 delivers an output signal $S^+_D$ which in faultless operation is equal to the input signal $S_D$. In correct operation of the scanners A, B, C, D and also of the scanning network 6, therefore, there are present at the outputs 11 and 12 the same signals $S_B$ and $S_D$ which are also present at the outputs 7 and 8. By means of the parallel processing of these signal pairs, as shown in FIG. 1, in the case of faultless operation, the same counter position 15 and 16 of the direction discriminators and counters will also be respectively produced. If the direction discriminators and counters use each pulse flank of the signals $\bar{8}$ and 11/12, respectively, for counting, the comparison of 45 with $S_B$ and 46 with $S_D$ over the two counting channels is adequate. If, on the contrary, only every other or every fourth pulse flank is used for counting, additional comparators for the signal pairs 45/$S_B$ and 46/$S_D$ are necessary, and may be connected to the comparator chain 26-27-28-29-17 at any point.

Figure 4:
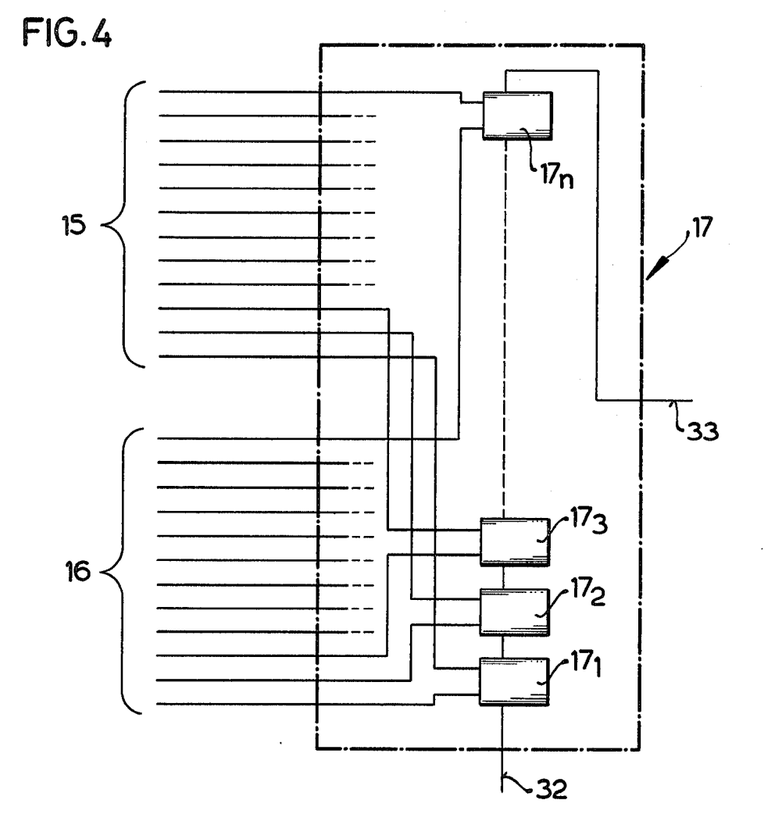
FIG. 4 shows a possible construction of the comparison circuit of FIG. 1 in the form of the series connection of a number of comparators.

The comparison circuit 17, as is shown in FIG. 4, is also built up in the same way of individual comparators $17_1$, $17_2$, $17_3$ . . . $17_n$ as has already been explained in principle in the case of the comparators 26 to 29.

Figure 5:
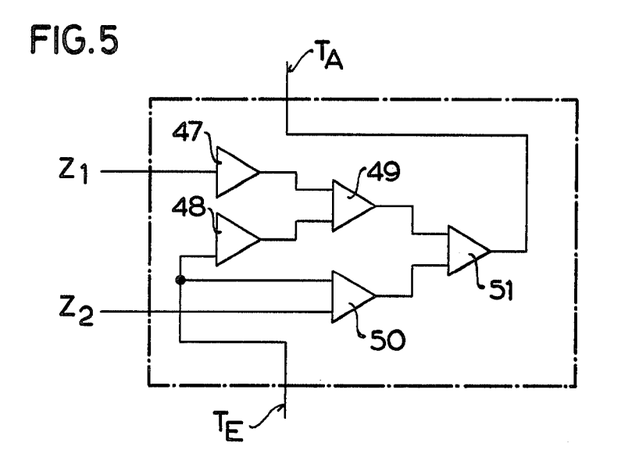
FIG. 5 shows a individual comparator for two binary numbers.

Each of the individual comparators $17_1$ to $17_n$ and 26 to 29, as shown in FIG. 5, is built up of five gates 47, 48, 49, 50 and 51. The gates 47 to 51 may be both NAND gates and also NOR gates. $Z_1$ and $Z_n$ denote the inputs for the numbers to be compared, $T_E$ the input for the timing frequency, $T_A$ the output, which is equal to the timing frequency provided the numbers $Z_1$ and $Z_2$ are equal and the comparator is operating faultlessly. The following tables show the mode of operation of the comparator. From these tables, it is evident that faults either of the comparator or of the numbers to be compared are recognised. The possibility of fault recognition (absence of the clock T at the output for the input combination $Z_1$; $Z_2 = 0$; 0 or 1; 1) is denoted by arrows.

Normal:

| $Z_1$ | $Z_2$ | 47 | 48 | 49 | 50 | 51 | $Z_1$ | $Z_2$ | 47 | 48 | 49 | 50 | 51 |
|---|---|---|---|---|---|---|---|---|---|---|---|---|---|
| 0 | 0 | 1 | $\bar{T}$ | T | 1 | $\bar{T}$ | 0 | 0 | 1 | $\bar{T}$ | 0 | $\bar{T}$ | T |
| 0 | 1 | 1 | $\bar{T}$ | T | $\bar{T}$ | 1 | 0 | 1 | 1 | $\bar{T}$ | 0 | 0 | $\bar{T}$ |
| 1 | 1 | 0 | $\bar{T}$ | 1 | $\bar{T}$ | T | 1 | 1 | 0 | $\bar{T}$ | T | 0 | $\bar{T}$ |
| 1 | 0 | 0 | $\bar{T}$ | 1 | 1 | 0 | 1 | 0 | 0 | $\bar{T}$ | T | $\bar{T}$ | 0 |
| NAND | | | | | | | NOR | | | | | | |

Fault testing

1) Gate 47 continuously = 0

| $Z_1$ | $Z_2$ | 47 | 48 | 49 | 50 | 51 | $Z_1$ | $Z_2$ | 47 | 48 | 49 | 50 | 51 |
|---|---|---|---|---|---|---|---|---|---|---|---|---|---|
| 0 | 0 | 0 | $\bar{T}$ | 1 | 1 | 0← | 0 | 0 | 0 | $\bar{T}$ | T | $\bar{T}$ | 0← |
| 0 | 1 | 0 | $\bar{T}$ | 1 | $\bar{T}$ | T | 0 | 1 | 0 | $\bar{T}$ | T | 0 | $\bar{T}$ |
| 1 | 1 | 0 | $\bar{T}$ | 1 | $\bar{T}$ | T | 1 | 1 | 0 | $\bar{T}$ | T | 0 | $\bar{T}$ |
| 1 | 0 | 0 | $\bar{T}$ | 1 | 1 | 0 | 1 | 0 | 0 | $\bar{T}$ | T | $\bar{T}$ | 0 |
| NAND | | | | | | | NOR | | | | | | |

2) Gate 47 continuously = 1

| $Z_1$ | $Z_2$ | 47 | 48 | 49 | 50 | 51 | $Z_1$ | $Z_2$ | 47 | 48 | 49 | 50 | 51 |
|---|---|---|---|---|---|---|---|---|---|---|---|---|---|
| 0 | 0 | 1 | $\bar{T}$ | T | 1 | $\bar{T}$ | 0 | 0 | 1 | $\bar{T}$ | 0 | $\bar{T}$ | T |
| 0 | 1 | 1 | $\bar{T}$ | T | $\bar{T}$ | 1 | 0 | 1 | 1 | $\bar{T}$ | 0 | 0 | 1 |
| 1 | 1 | 1 | $\bar{T}$ | T | $\bar{T}$ | 1← | 1 | 1 | 1 | $\bar{T}$ | 0 | 0 | 1← |
| 1 | 0 | 1 | $\bar{T}$ | T | 1 | $\bar{T}$ | 1 | 0 | 1 | $\bar{T}$ | 0 | $\bar{T}$ | T |

3) Gate 48 continuously = 0

| $Z_1$ | $Z_2$ | 47 | 48 | 49 | 50 | 51 | $Z_1$ | $Z_2$ | 47 | 48 | 49 | 50 | 51 |
|---|---|---|---|---|---|---|---|---|---|---|---|---|---|
| 0 | 0 | 1 | 0 | 1 | 1 | 0← | 0 | 0 | 1 | 0 | 0 | $\bar{T}$ | T |
| 0 | 1 | 1 | 0 | 1 | $\bar{T}$ | T | 0 | 1 | 1 | 0 | 0 | 1 | 0← |
| 1 | 0 | 0 | 0 | 1 | 1 | 0 | 1 | 0 | 0 | 0 | 1 | $\bar{T}$ | 0 |

4) Gate 48 continuously = 1

| $Z_1$ | $Z_2$ | 47 | 48 | 49 | 50 | 51 | $Z_1$ | $Z_2$ | 47 | 48 | 49 | 50 | 51 |
|---|---|---|---|---|---|---|---|---|---|---|---|---|---|
| 0 | 0 | 1 | 1 | 0 | 1 | 1← | 0 | 0 | 1 | 1 | 0 | $\bar{T}$ | T |
| 0 | 1 | 1 | 1 | 0 | $\bar{T}$ | 1 | 0 | 1 | 1 | 1 | 0 | 0 | 1 |
| 1 | 1 | 0 | 1 | 1 | $\bar{T}$ | T | 1 | 1 | 0 | 1 | 0 | 0 | 1← |
| 1 | 0 | 0 | 1 | 1 | 1 | 0 | 1 | 0 | 0 | 1 | 0 | $\bar{T}$ | T |
| NAND | | | | | | | NOR | | | | | | |

5) Gate 49 continuously = 0

| $Z_1$ | $Z_2$ | 47 | 48 | 49 | 50 | 51 | $Z_1$ | $Z_2$ | 47 | 48 | 49 | 50 | 51 |
|---|---|---|---|---|---|---|---|---|---|---|---|---|---|
| 0 | 0 | | | 0 | 1 | 1← | 0 | 0 | | | 0 | $\bar{T}$ | T |
| 0 | 1 | | | 0 | $\bar{T}$ | 1 | 0 | 1 | | | 0 | 0 | 1 |
| 1 | 1 | | | 0 | $\bar{T}$ | 1← | 1 | 1 | | | 0 | 0 | 1← |
| 1 | 0 | | | 0 | 1 | 1 | 1 | 0 | | | 0 | $\bar{T}$ | T |
| NAND | | | | | | | NOR | | | | | | |

6) Gate 49 continuously = 1

| $Z_1$ | $Z_2$ | 47 | 48 | 49 | 50 | 51 | $Z_1$ | $Z_2$ | 47 | 48 | 49 | 50 | 51 |
|---|---|---|---|---|---|---|---|---|---|---|---|---|---|
| 0 | 0 | | | 1 | 1 | 0← | 0 | 0 | | | 1 | $\bar{T}$ | 0← |
| 0 | 1 | | | 1 | $\bar{T}$ | T | 0 | 1 | | | 1 | 0 | 0 |
| 1 | 1 | | | 1 | $\bar{T}$ | T | 1 | 1 | | | 1 | 0 | 0← |
| 1 | 0 | | | 1 | 1 | 0 | 1 | 0 | | | 1 | $\bar{T}$ | 0 |
| NAND | | | | | | | NOR | | | | | | |

7) Gate 50 continuously = 0

| $Z_1$ | $Z_2$ | 47 | 48 | 49 | 50 | 51 | $Z_1$ | $Z_2$ | 47 | 48 | 49 | 50 | 51 |
|---|---|---|---|---|---|---|---|---|---|---|---|---|---|
| 0 | 0 | | | T | 0 | 1← | 0 | 0 | | | 0 | 0 | 1← |
| 0 | 1 | | | T | 0 | 1 | 0 | 1 | | | 0 | 0 | 1 |
| 1 | 1 | | | 1 | 0 | 1← | 1 | 1 | | | T | 0 | $\bar{T}$ |
| 1 | 0 | | | 1 | 0 | 1 | 1 | 0 | | | T | 0 | $\bar{T}$ |
| NAND | | | | | | | NOR | | | | | | |

8) Gate 50 continuously = 1

| $Z_1$ | $Z_2$ | 47 | 48 | 49 | 50 | 51 | $Z_1$ | $Z_2$ | 47 | 48 | 49 | 50 | 51 |
|---|---|---|---|---|---|---|---|---|---|---|---|---|---|
| 0 | 0 | | | T | 1 | $\bar{T}$ | 0 | 0 | | | 0 | 1 | 0← |
| 0 | 1 | | | T | 1 | $\bar{T}$ | 0 | 1 | | | 0 | 1 | 0 |
| 1 | 1 | | | 1 | 1 | 0← | 1 | 1 | | | T | 1 | 0← |
| 1 | 0 | | | 1 | 1 | 0 | 1 | 0 | | | T | 1 | 0 |
| NAND | | | | | | | NOR | | | | | | |

9) Gate 50 $T_E$ input interrupted
$T_E$ input continuously = 0

| $Z_1$ | $Z_2$ | 47 | 48 | 49 | 50 | 51 | $Z_1$ | $Z_2$ | 47 | 48 | 49 | 50 | 51 |
|---|---|---|---|---|---|---|---|---|---|---|---|---|---|
| 0 | 0 | | | T | 1 | $\bar{T}$ | 0 | 0 | | | 0 | 1 | 0← |
| 0 | 1 | | | T | 1 | $\bar{T}$ | 0 | 1 | | | 0 | 0 | $\bar{T}$ |
| 1 | 1 | | | 1 | 1 | 0← | 1 | 1 | | | T | 0 | $\bar{T}$ |
| 1 | 0 | | | 1 | 1 | 0 | 1 | 0 | | | T | 1 | 0 |
| NAND | | | | | | | NOR | | | | | | |

10) Gate 50 $T_E$ input continuously = 1

| $Z_1$ | $Z_2$ | 47 | 48 | 49 | 50 | 51 | $Z_1$ | $Z_2$ | 47 | 48 | 49 | 50 | 51 |
|---|---|---|---|---|---|---|---|---|---|---|---|---|---|
| 0 | 0 | | | T | 1 | $\bar{T}$ | 0 | 0 | | | 0 | 0 | 1← |
| 0 | 1 | | | T | 0 | 1 | 0 | 1 | | | 0 | 0 | $\bar{T}$ |
| 1 | 1 | | | 1 | 0 | 1← | 1 | 1 | | | T | 0 | $\bar{T}$ |
| 1 | 0 | | | 1 | 1 | 0 | 1 | 0 | | | T | 0 | $\bar{T}$ |

-continued

| 10) Gate 50 $T_E$ input continuously = 1 | | | | | | | | | | | | | |
|---|---|---|---|---|---|---|---|---|---|---|---|---|---|
| $Z_1$ | $Z_2$ | 47 | 48 | 49 | 50 | 51 | $Z_1$ | $Z_2$ | 47 | 48 | 49 | 50 | 51 |
| NAND | | | | | | | NOR | | | | | | |

Each simple fault of any input or any output is therefore recognised.

The arrangement described is particularly suitable for use in the case of balances because in that case particularly strict requirements are called for regarding the reliability of the results. It is, of course, utilisable with advantage whereever a particularly reliable automatic distance measurement is required.

What we claim is:

1. An incremental measuring system for lengths or angles, comprising a divided scale and a plurality of scanning elements, every scanning element delivering a signal changing between two binary values upon motion of the divided scale relatively to the scanning elements, the arrangement being such that some combinations of binary values of the various signals from the scanning elements do not occur in the case of faultless operation of all scanning elements (in the following called forbidden combinations contrary to permitted combinations), further comprising a logical network fed by the signals from the scanning elements, the logical network producing a binary output signal which is equal to a predetermined one of the signals from the scanning elements as long as a permitted combination of binary values is fed to the logical network, and which binary output signal is different from the said predetermined one of the signals from the scanning elements as long as a forbidden combination of binary values is fed to the logical network, further comprising at least two counters one of them being fed by the output signal of the logical network and an other of them being fed directly by the said predetermined one of the signals from the scanning elements, and further comprising a comparison circuit having a plurality of comparators for comparing the respective individual positions of the said counters.

2. A measuring system as claimed in claim 1, characterised in that the network, in the case of faulty operation of at least one of its logical circuit elements or connecting elements, delivers an output signal which is unequal to the selected scanning signal.

3. A measuring system as claimed in claim 2, characterized in that the circuit elements and connecting elements whose input faults remain undetected by said logical network are constructed in duplicate and their output signals are supplied directly to separate comparators.

4. A measuring system as claimed in claim 3, characterised in that the first NAND gate and the second NAND gate are each provided in duplicate, and in that the outputs of these two NAND-gate pairs are each supplied directly to a comparator.

5. A measuring system as claimed in claim 2, characterised in that the scanning network operates according to the logical equation $S^+_B = S_A S_B + S_C(S_A + S_B)$ if $S_A$, $S_B$, $S_C$ are signals from the scanning elements and $S^+_B$ is the output signal of the scanning network.

6. A measuring system as claimed in claim 2, characterised in that two of the scanning signals ($S_A$, $S_B$, $S_C$) are fed by way of a respective inverter to the inputs of a first NAND or NOR gate, in that the same two scanning signals ($S_A$, $S_B$) are each fed directly to the inputs of a second NAND or NOR gate, in that the output of the first NAND or NOR gate and the third scanning signal ($S_C$) are fed to a third NAND or NOR gate, in that the output of the second NAND or NOR gate and the output of the third NAND or NOR gate are fed to the inputs of a fourth NAND or NOR gate, whose output represents the output of the scanning network.

7. A measuring system as claimed in claim 1 wherein said scanning signals are phase-displaced by 90° relative to each other, characterized in that two logical networks are provided, in that the input signal combination applied to the first logical network comprises a first predetermined scanning signal, in that the input signal combination applied to the second logical network comprises a second predetermined scanning signal, phase-displaced by 90° relative to the first, in that the first logical network, corresponding to permitted or forbidden combinations, produces a first output signal, equal or unequal to the first predetermined scanning signal, in that the second logical network, corresponding to permitted or forbidden combinations, produces a second putput signal equal or unequal to the second predetermined scanning signal, and in that a first direction discriminator preceding the first counter and a second direction discriminator preceding the second counter are each controlled by the first and second scanning signals, respectively, and by a predetermined one of said output signals of the first and second logical networks, wherein each of said logical network outputs can be used to control only one of said direction discriminators.

8. A measuring system as claimed in claim 1, characterized in that the circuit elements and connecting elements whose faults remain undetected by said logical network are constructed in duplicate and the output signals of respective duplicate elements are supplied directly to separate comparators, and further characterized in that each comparator of said comparison circuit and of said separate comparators includes two inputs for the numbers to be compared and a third input for a time signal supplied by a clock generator, and in that the presence or absence of an A.C. voltage at the output of the comparator signals the presence or absence of a fault.

9. A measuring system as claimed in claim 8, characterized in that each comparator, in the case of equality of the two numbers to be compared, delivers at its output an A.C. signal corresponding to the clock signal and, in the case in inequality of the two numbers to be compared, it delivers a D.C.-signal continuously at its output.

10. A measuring system as claimed in claim 9, characterized in that each comparator, in the case of equality at least at the level of one of the possible binary values (0 or 1) of the two numbers to be compared, delivers continuously 0 or 1 at its output if one of its own logical circuit elements or connecting elements is operating defectively.

11. A measuring system as claimed in claim 10, characterised in that the clock signal is fed to the input of a first gate and to the input of a second gate, one of the numbers to be compared is fed to the other input of the second gate, the other one of the numbers to be compared is fed to the input of a third gate, the output of the first gate and the output of the third gate are fed to the inputs of a fourth gate, the outputs of the second gate and of the fourth gate are fed to the inputs of a fifth gate, whose output represents the output of the comparator (FIG. 5).

12. A measuring system as claimed in claim 10, characterised in that an additional automatic test circuit applies for a short time at regular intervals to both number inputs of the comparator instead of the numbers the binary value (0 or 1), for which the comparator circuit indicates faulty operation of its own circuit elements or connecting elements.

13. A measuring system as claimed in claim 9, characterized in that the individual comparators are connected in series such that in each case the output of one comparator is fed to the time input of the following comparator, and such that the output of the last comparator represents the output of the entire comparison arrangement.

14. A measuring system as claimed in claim 13, characterized in that there is connected to the output of the the last comparator in series connected comparators an indicating circuit comprising a rectified and a time element, which element suppresses pulses from transit-time effects on the basis of their short length, but allows the timing frequency to proceed to indication.

* * * * *

UNITED STATES PATENT AND TRADEMARK OFFICE
CERTIFICATE OF CORRECTION

PATENT NO. : 4,110,828
DATED : August 29, 1978
INVENTOR(S) : ALFONS BAUMGARTNER et al.

It is certified that error appears in the above-identified patent and that said Letters Patent are hereby corrected as shown below:

| | |
|---|---|
| Col. 1, l. 46 | "fals" should read --false--. |
| Col. 1, l. 51 | "diagramm" should read --diagram--. |
| Col. 2, l. 26 | "putput" should read --output--. |
| Col. 2, l. 26 | "$\frac{7}{8}$" should read --7/8--. |
| Col. 2, l. 28 | "$\frac{7}{8}$" should read --7/8--. |
| Col. 2, l. 41 | "$\frac{7}{8}$" should read --7/8--. |
| Col. 2, l. 56 | "recognised" should read --recognized--. |
| Col. 4, l. 6 | "realised" should read --realized--. |
| Col. 4, l. 23 | "recognised" should read --recognized--. |

UNITED STATES PATENT AND TRADEMARK OFFICE
CERTIFICATE OF CORRECTION

PATENT NO. : 4,110,828
DATED : August 29, 1978
INVENTOR(S) : ALFONS BAUMGARTNER et al.

It is certified that error appears in the above-identified patent and that said Letters Patent are hereby corrected as shown below:

| | |
|---|---|
| Col. 4, l. 42 | after "are" insert --:--. |
| Col. 4, l. 47 | "recognised" should read --recognized--. |
| Col. 5, l. 10 | "$\frac{7}{8}$" should read --7/8--. |
| Claim 1, l. 22 | "an" should read --the--. |
| Claim 7, l. 15 | "putput" should read --output--. |
| Claim 14, l. 3 | delete "the" |

Signed and Sealed this

Seventeenth Day of April 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,110,828
DATED : August 29, 1978
INVENTOR(S) : ALFONS BAUMGARTNER et al.

It is certified that error appears in the above—identified patent and that said Letters Patent are hereby corrected as shown below:

Cover page, left hand column, the "Assignee" should read --Bizerba-Werke Wilhelm Kraut KG, Balingen, and Dr. Johannes Heidenhain GmbH, Traunreut, West Germany--.

Signed and Sealed this

Twenty-fifth Day of September 1979

[SEAL]

Attest:

*Attesting Officer*

LUTRELLE F. PARKER
*Acting Commissioner of Patents and Trademarks*